INVENTORS
FRITZ O. HENNIG
LEO P. McGUIRE
BY Popp and Sommer
ATTORNEYS

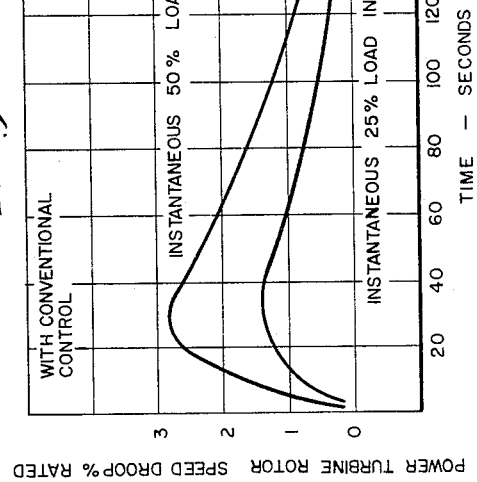
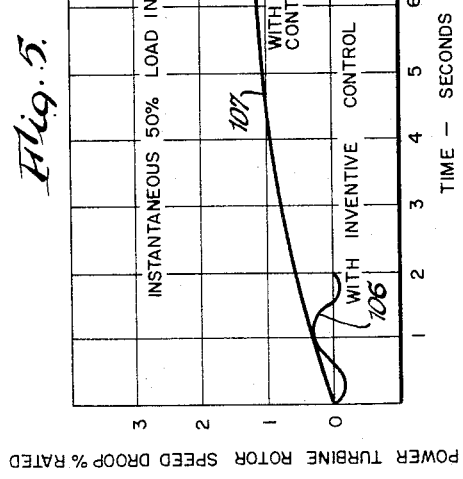
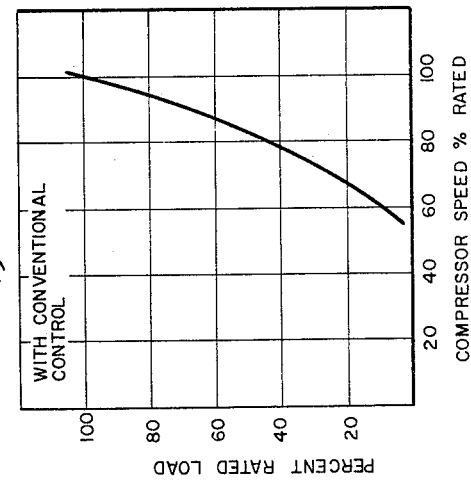
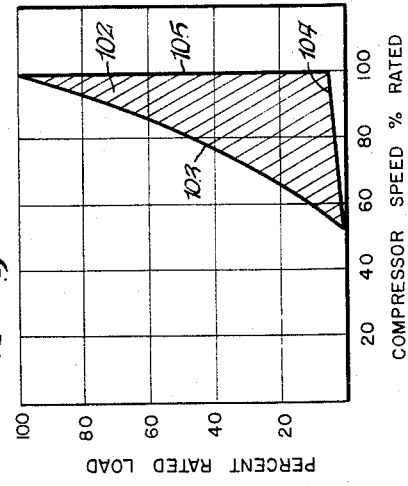
INVENTORS
FRITZ O. HENNIG
LEO P. McGUIRE
BY Popp and Sommer
ATTORNEYS INVENTORs
FRITZ O. HENNIG
LEO P. McGUIRE
BY Popp and Sommer
ATTORNEYS June 14, 1966  F. O. HENNIG ETAL  3,255,586
GAS TURBINE CAPABLE OF RAPIDLY ACCEPTING OR REJECTING
A LOAD WITH MINIMUM SPEED DEVIATION
Filed Sept. 12, 1962  4 Sheets-Sheet 4
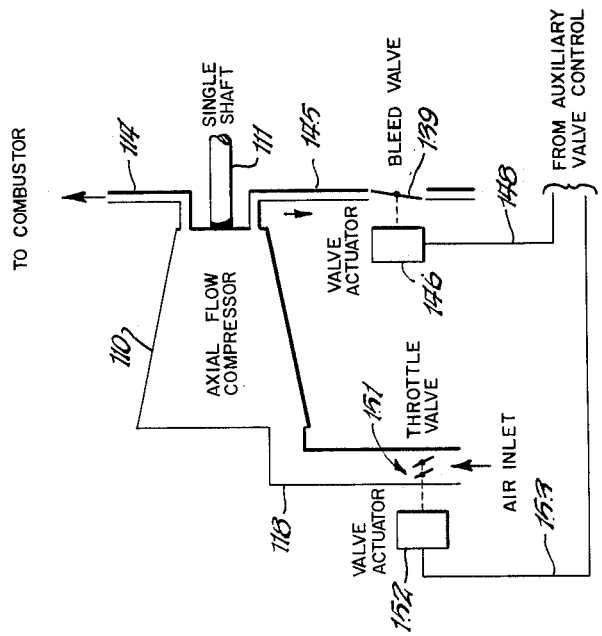
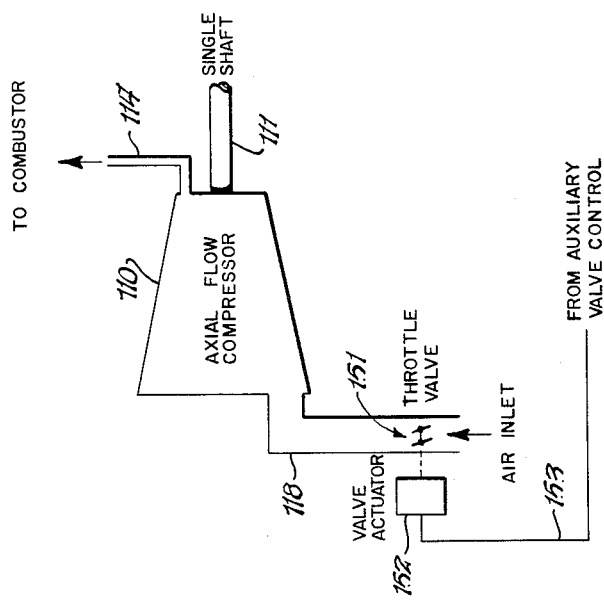
INVENTORs
FRITZ O. HENNIG
LEO P. McGUIRE
BY Popp and Sommer
ATTORNEYS.

United States Patent Office 3,255,586
Patented June 14, 1966

3,255,586
GAS TURBINE CAPABLE OF RAPIDLY ACCEPTING OR REJECTING A LOAD WITH MINIMUM SPEED DEVIATION
Fritz O. Hennig, Olean, N.Y., and Leo P. McGuire, Emaus, Pa., assignors to Dresser Industries, Inc., Dallas, Tex., a corporation of Delaware
Filed Sept. 12, 1962, Ser. No. 223,163
32 Claims. (Cl. 60—39.03)

This invention relates to improvements in construction and operation of gas turbines.

In gas turbines of conventional construction and operation, when a load is coupled to or uncoupled from the power turbine rotor within a fraction of a second, and hence what may be considered rapidly or instantaneously, there is a significant change in the rotational speed of the power turbine rotor, the speed decreasing with load application and increasing with load rejection and the degree of speed variation being related to the magnitude and rate of load change. If the load on the rotary load device driven by the power turbine rotor must be so suddenly applied or rejected because of the purpose for which the load device is used, and further if the relatively significant variation in turbine drive speed which would normally result exceeds the speed deviation which can be tolerated for such use, a conventional gas turbine is completely unsatisfactory as a prime mover for the load device under these special circumstances.

In order to overcome these undesirable conditions, it is the primary object of the present invention to provide a gas turbine which is capable of rapidly accepting or rejecting a load, even one of substantially full-rated capacity, with a minimum of speed deviation.

Another object is to provide such a gas turbine which is capable of rapidly accepting or rejecting a load with a minimum of temperature change in the drive fluid supplied to the turbine blades whereby thermal shock is avoided.

Another object is to provide a control system for a gas turbine which effects alternate and rapid load acceptance and rejection within small predetermined limits of speed deviation of the power turbine rotor and which allows such rotor to recover very quickly from such upset in speed.

A further object is to provide such a control system for either a dual or single shaft gas turbine. A dual shaft turbine comprises an axial flow air compressor connected by one shaft to a high pressure turbine rotor, and also includes a low pressure or free turbine rotor, which serves as the power turbine rotor, fast to another shaft separate from the first mentioned shaft. A single shaft gas turbine comprises a single shaft to which are connected both an axial flow compressor and a turbine rotor which serves as the power turbine rotor for driving both the compressor and rotary load device.

Another aim is to provide such a gas turbine which, while capable of rapidly accepting or rejecting a load, is efficient in fuel consumption. Particularly in the case of a dual shaft gas turbine constructed in accordance with the present invention, the characteristic of good economy in fuel consumption when operating under low load conditions is desirably preserved.

A still further object is to provide such a control system which permits the normal use of conventional safety devices in the event of malfunctioning.

Other objects and advantages of the present invention will be aparent from the following detailed description in two embodiments thereof illustrated in the accompanying drawings in which:

FIG. 2 is a graph showing the relationship of change in compressor-rotor speed to change in load in a typical conventional dual shaft gas turbine.

FIG. 3 is a graph showing the change in speed of the power turbine rotor of a typical conventional dual shaft gas turbine and also showing the time lag of such rotor's return to normal speed when the gas turbine is subjected to an instantaneous increase in load; two curves being illustrated, one for a 25 percent and the other for a 50 percent load increase.

FIG. 4 is a graph similar to that of FIG. 2, the cross-hatched area representing the zone in which a typical dual shaft gas turbine such as shown in FIG. 1 may be operated according to the present invention concept.

FIG. 5 is a graph similar to that of FIG. 3 but having a much larger time scale as the abscissa and showing a comparison of speed deviation and time lag of the power turbine rotors of typical conventional and inventive dual shaft gas turbines when severally subjected to a 50 percent instantaneous load increase.

FIG. 7 is a fragmentary diagrammatic view, similar to FIG. 6, showing a first modification of the inventive control for a single shaft gas turbine.

FIG. 8 is a fragmentary diagrammatic view, similar to FIGS. 6 and 7, showing a second modification of the inventive control for a single shaft gas turbine.

DUAL SHAFT GAS TURBINE, FIGS. 1–5

Applicants' invention is particularly advantageous in that situation where a substantial load must be either accepted or rejected by the gas turbine in a fraction of a second, and without producing more than an exceedingly small variation in the rotational speed of the rotary load device driven by the power turbine rotor. A typical example of such a load device is an electrical A.C. generator on which the load changes alternately and cyclically from 100 percent level, say 8000 kw., to 10 percent level or 800 kw., within 0.01 second, with a generator-rotor and hence power turbine rotor speed of 3600 r.p.m. which cannot vary more than 1 percent of such rated speed and recovery from speed deviation or upset must occur within two seconds.

Figure 1:
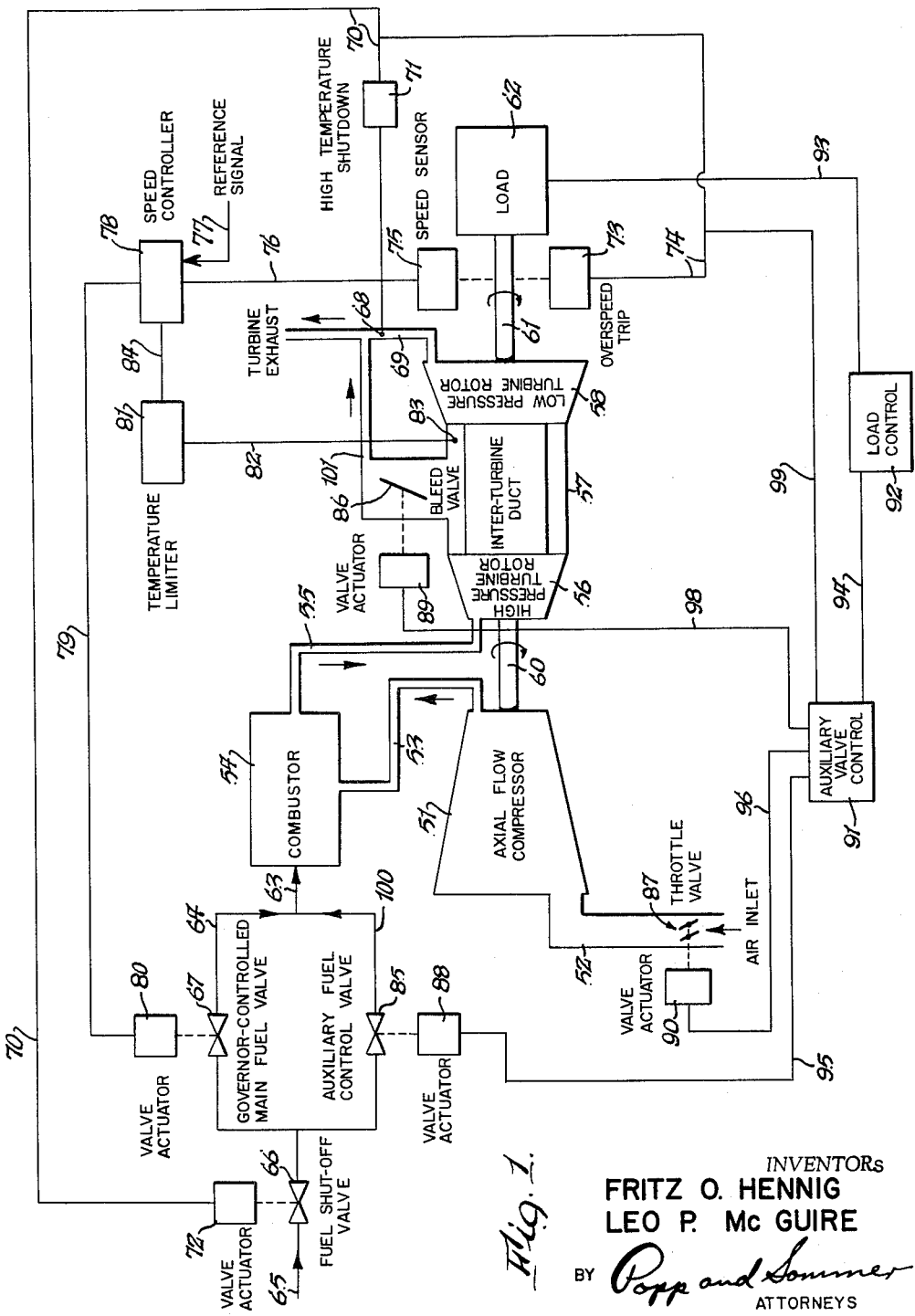
FIG. 1 is a diagrammatic view of a dual shaft turbine constructed in accordance with the principles of the present invention and therefore constituting one embodiment thereof.

The dual shaft gas turbine shown in FIG. 1 and embodying one form of the present inventive concept is capable of being operatively associated with such a variable load. However, the practice of the invention is not intended to be confined to the aforementioned specific operating conditions which are recited only to illustrate the practical utility of the present invention.

Before the inventive dual shaft gas turbine shown in FIG. 1 is described in detail, brief reference to the characteristics of a conventional dual shaft gas turbine will be made in connection with FIGS. 2 and 3. The use of a conventional governing system in conjunction with a conventional open cycle dual shaft gas turbine imposes restrictions on the rate at which load may be accepted or rejected if operation is to be maintained in a limited speed range. This is due primarily to the time required for the compressor-high pressure turbine rotor to accelerate and decelerate. FIG. 2, in which load is plotted against compressor speed, illustrates the change in compressor-high pressure turbine rotor speed with load in a typical conventional dual shaft gas turbine. The rate of acceleration is also usually restricted by the surge characteristic of the compressor which means that the fuel input must be limited. The response of a typical conventional dual shaft gas turbine with an instantaneous load change is graphically depicted in FIG. 3 in which low pressure or power turbine rotor speed droop is plotted against time. From this it is apparent that power turbine rotor speed cannot be maintained within close limits if loads are instantaneously applied. While load sensing, rather than, or in addition to, speed sensing, may increase the response slightly, it still does not compensate for the lag of the compressor-high pressure turbine rotor.

Adverting now to the inventive dual shaft gas turbine shown in FIG. 1, such gas turbine permits preparation for and instantaneous acceptance or rejection of near rated load or any portion thereof with minimum power turbine rotor speed deviation, minimum temperature change and maximum fuel economy. This is accomplished by operating at constant or nearly constant compressor-high pressure turbine rotor speed when large load changes are made.

Such dual shaft gas turbine is shown diagrammatically in FIG. 1 as including an axial flow air compressor 51 having an air inlet conduit or intake duct 52 and a compressed air outlet conduit or discharge duct 53 leading to a combustor or combustion chamber 54. The hot gases resulting from the combustion of fuel in the air supplied by the compressor 51 are conducted from the combustor 54 through the conduit 55 to the inlet for a high pressure turbine rotor 56. An annular inter-turbine duct 57 connects the outlet of the high pressure turbine motor 56 with the inlet of a low pressure or power turbine rotor 58. The high pressure turbine rotor 56 is connected by a shaft 60 to the rotor of the compressor 51. The power turbine rotor 58 is fast to another shaft 61, separate from the first shaft 60, suitably arranged to drive a rotary load device indicated at 62 on which the load is alternately and rapidly applied and removed whereby the power turbine rotor alternately accepts and rejects an instantaneous load. If the load device 62 is an electric generator the load may be coupled to and uncoupled from the power turbine rotor 58 by the operation of a circuit breaker.

Fuel is supplied to the combustor 54 through an inlet conduit or pipe 63 which is connected via a branch conduit or pipe 64 to a fuel main supply conduit or pipe 65. A fuel shut-off valve 66 is shown as operatively arranged in the main conduit 65 and a main or governor-controlled fuel valve 67 is shown as operatively arranged in the branch conduit 64. Adjustment of this valve 67 controls the main flow of fuel to the combustor 54.

A temperature sensor 68 such as a thermocouple is shown arranged in an exhaust conduit or duct 69 for the power turbine rotor 58. This temperature sensor is operatively associated via the line 70, in which a high temperature shutdown device 71 is shown arranged, with a valve actuator 72 arranged to actuate the fuel shut-off valve 66. In the event the temperature sensed in exhaust duct 69 rises to an excessive level, the device 71 is operated which in turn activates actuator 72 to turn off valve 66. The signal transmitted via line 70 may be electric, pneumatic or hydraulic and the actuator 72 will be selected as to type to be responsive to the type of signal transmitted. The high temperature shutdown 71 is a device which is actuated in the event of control malfunction and actuates the fuel shut-off valve 66 in the event of excessive exhaust gas temperature.

Overspeed trip means 73 of suitable type are shown operatively associated with the power turbine rotor 58 and its shaft 61 and also operatively associated via the line 74 with the fuel shut-off valve 66, the line 74 being connected to the line 70 leading to this valve's actuator 72. The overspeed trip 73 is a safety device which is actuated normally at 110 percent rated speed and prevents damaging overspeeds by actuating the fuel shut-off valve 66.

In order to govern the speed of the power turbine rotor 58 and its shaft 61, speed sensing means 75 are provided which are operatively associated with the shaft 61 and also operatively associated via a line 76 with speed controller means 78. These means 78 are operatively associated via a line 79 with an actuator 80 arranged to operate the main fuel control valve 67. The speed sensor 75 senses the power turbine rotor speed and relays to the controller 78 a signal proportional to the shaft speed. The speed sensor signal may be electric, pneumatic or hydraulic. The speed controller 78 senses the signal from the speed sensor 75 and after comparing with a reference signal, shown as admitted through line 77 relays to the fuel valve actuator 80 a signal proportional to the speed and the difference between the speed signal and reference signal. The speed controller output signal may be electric, pneumatic or hydraulic. The type of actuator 80 employed will depend upon the type of its command signal. In any event, this actuator 80 will adjust the fuel valve 67 to a position proportional to the signal from the speed controller 78.

Inasmuch as it is undesirable to have the gases flowing through the inter-turbine duct 57 exceed a predetermined temperature, temperature limiter means 81 are preferably provided. Such means are operatively associated via the line 82 with a temperature sensor 83 such as a thermocouple arranged in the inter-turbine duct 57, and are also operatively associated via the line 84 with the speed controller means 78. The output signal of the temperature limiter 81 and transmitted via line 84 may be electric, pneumatic or hydraulic depending upon the nature of the devices 83, 81 and 78. The temperature limiter 81 is a safety device which in the event of overload overrides the output signal of the speed controller 78 and reduces the fuel input to the combustor 54 so as to prevent excessively high turbine gas temperatures.

What has been described so far in FIG. 1 is a conventional dual shaft gas turbine with a conventional control system.

In accordance with the principles of the present invention, the embodiment shown in FIG. 1 includes means for effecting rapid load acceptance and rejection within predetermined limits of speed deviation of the power turbine rotor 58. Such means are shown as comprising auxiliary valve means including a first valve 85 arranged to control the flow of auxiliary fuel to the combustor 54, a second valve 86 communicating with the inter-turbine duct 57 and operative to bleed-off drive fluid flowing therethrough, and a third valve 87 arranged in the air intake duct 52 for the compressor 51 and operative to throttle the air supply to the compressor. Each of the auxiliary valves 85, 86 and 87 has suitable actuator means represented at 88, 89 and 90, respectively operatively associated therewith.

The means for effecting rapid load acceptance and rejection are also shown as comprising auxiliary valve control means 91 and load control means 92. The load control means 92 are shown as being operatively associated via the line 93 with the load device 62, and also operatively associated via the line 94 with the valve control means 91. These valve control means 91 are shown as being operatively associated via the line 95 with the actuator 88 for the auxiliary fuel control valve 85; via the line 96 with the actuator 90 for the air throttle valve 87; and via the line 98 with the actuator 89 for the bleed valve 86. The valve control means 91 are also shown as being operatively associated via a line 99 with the fuel shut-off valve 66 by reason of connection of the line 99 to the line 74.

The load control device 92 is a programmer of any suitable construction which signals the auxiliary valve control device 91 via line 94 that the load is to be applied or rejected and also closes via line 93 the load device, such as a generator circuit breaker, at the proper instant. In other words, the load control device 92 is a variable timing device and is set according to the nature and magnitude of the load for the cyclic operation desired.

The auxiliary valve control means 91 comprise instrumentalities of suitable type and construction so arranged as to permit individual settings for the various auxiliary valves 85, 86 and 87 according to the desired load and to transmit the signal via the respective lines 95, 98 and 96 upon receipt of a signal via the line 94 from the load control device 92. The signal transmitted over line 94, may be electric, pneumatic or hydraulic, as may also be the signals transmitted over lines 95, 96, 98 and 99. The valve actuators 88, 89 and 90 associated with the respective lines 95, 98 and 96 are selected as to type depending upon the nature of the signal transmitted over these lines. The valve control means 91 may be arranged to actuate the valves 85, 86 and 87 to a predetermined safe position in case the control system should malfunction.

The auxiliary fuel control valve 85 which may be of any suitable type is shown as operatively arranged in a branch conduit 100 at one end connected to the fuel main supply conduit 65 on the downstream side of the shut-off valve 66, and at its other end connected to the inlet conduit 63 leading to the combustor 54. This auxiliary fuel valve 85 and its actuator 88 are arranged for rapid positioning in proportionate response to a signal received over line 95 from the auxiliary valve control means 91. The purpose of this auxiliary fuel valve 85 is to increase the fuel input to the turbine at the time of load acceptance, or to decrease it in the case of load rejection, so that the main fuel control valve 67 which is governor-controlled need not change position other than to compensate for differences in anticipated and actual load values.

The bleed valve 86 is preferably of the butterfly type and is shown as operatively arranged in a bypass duct 101 interiorly communicating at one end with the inter-turbine duct 57 and at its other end with the turbine exhaust duct 69. This bleed valve 86 and its actuator 89 are arranged for rapid positioning in proportionate response to a signal received over line 98 from the auxiliary valve control means 91. The purpose of this valve 86 is to bleed hot gas from the inter-turbine duct 57 so that the compressor-rotor speed will increase in order to supply the gas flow required to maintain a given power requirement from the low pressure or power turbine rotor 58.

The throttle valve 87 in the compressor inlet duct 52 preferably comprises one or more vanes ganged together. It and its actuator 90 are also arranged for rapid positioning in proportionate response to a signal received over line 96 from the auxiliary valve control means 91. The purpose of this throttle valve 87 is to reduce the air flow through the compressor 51 which results in an additional increase in compressor speed for a given load. The throttle valve 87 is sized such that when it is in what is termed the closed position the flow through the air inlet duct 52 is not completely cut off. Reduction of air flow through the compressor 51 also raises the turbine inlet temperature.

From the foregoing, it will be seen that the air throttle valve 87, when closed or substantially so, in conjunction with the inter-turbine bleed valve 86, when open, and while the auxiliary fuel control valve 85 is closed, permits full load compressor speed with a small load on the power turbine rotor 58. Thus the turbine may be operated at near full load compressor speed and full load temperature with only a small percentage, such as 5 or 10 percent, rated load on the power turbine rotor 58. This permits, with rapid closure of the inter-turbine bleed valve 86 and simultaneous opening of the throttle valve 87 and auxiliary fuel control valve 85, the application of full rated load to the turbine without thermal shock and excessive speed deviation of the power turbine rotor 58 due to the inherent delay of the compressor-rotor.

In greater detail, the operation may be described as follows. At base load which is the lower load level at which the gas turbine is to operate for a time during the cycle of operation, fuel supplied to the combustor 54 is reduced by reason of the auxiliary fuel control valve 85 being closed; the compressor 51 is relatively starved for air due to the throttle valve 87 being closed or substantially so, resulting in speed-up of the compressor and increase in the turbine inlet temperature; and the bleed valve 86 is open which causes the compressor 51 to speed up. These effects collectively enable the compressor-rotor to rotate at a speed substantially that at which it rotates when at full load, although the actual load on the power turbine rotor 58 is considerably lower, say only 5 or 10 percent of rated load. The degree to which the various auxiliary valves 85, 86 and 87 are closed or opened depends upon the level of the base load in relation to rated load. At the higher load such as full load at which the gas turbine is to operate for another time during the cycle of operation, it is desired to supply more fuel and more air to the combustor 54 and to eliminate or at least reduce the bleed-off of hot gas at valve 86. This is accomplished when full load is applied instantaneously by quickly and substantially simultaneously operating the three auxiliary valves, specifically opening auxiliary fuel control valve 85, opening throttle valve 87 and closing bleed valve 86. The governor-controlled main fuel valve 67 will remain essentially unchanged in position when the full load is applied since the speed of the power turbine rotor 58 varies only slightly. Of course, instead of changing the load from some base level to full load level, the load can change to a level higher than base part but below full load. This will determine the extent of adjustment of the auxiliary valves 85, 86 and 87. This all depends upon the nature of the load with which the gas turbine is operatively associated as a prime mover.

Alternatively, the load can change instantaneously from a high level such as full load to a low or base level such as 5 or 10 percent of rated load, as when the gas turbine operates on a cycle of alternate load acceptance and rejection. When load rejection occurs, the then previously open auxiliary fuel valve 85 and air throttle valve 87 are closed quickly and substantially simultaneously with the quick opening of the bleed valve 86. The degree or extent to which these valves operate, either to close or open, will again depend upon the load differential.

Where the load change is not too great, whether being increased or decreased, either one of the auxiliary valves 86 and 87 may be operated solely without operating the other. However, where the load change is great, the two auxiliary valves 86 and 87 should be operated simultaneously in the manner explained hereinabove. Operation of the auxiliary fuel control valve 85 will always be such as to supply the fuel difference between base and applied load.

As a way of setting up the turbine for the alternate and rapid acceptance and rejection of a load, the turbine may be started normally and the base load applied, such as 5 or 10 percent of rated load. Then the inter-turbine bleed valve 86 is adjusted to an open position. The result is increase in compressor speed and mass flow, and decrease in turbine inlet temperature while the governor or speed controller 78 maintains constant power turbine rotor speed. The air throttle valve 87 is then adjusted to a closed position. The result is additional increase in compressor speed, decrease in mass flow and increase in turbine inlet temperature. The auxiliary valve control means 91 are adjusted to pre-set the signals for operating the three auxiliary valves 85, 86 and 87 according to the desired load change. Finally, the load control means 92 is programmed to cyclically and alternately couple and uncouple the load device 62 at the desired time intervals and also to signal the auxiliary valve control means 91 for operation of the auxiliary valves 85, 86 and 87 so that they will be actuated in proper anticipatory timed relation to load application or rejection.

Referring to FIG. 4, it will be seen that the cross-hatched area 102, circumscribed by the normal operating line 103 for the dual shaft gas turbine without operation of the auxiliary valves, the base load line 104 and the vertical line 105 connecting the ends of these first two mentioned lines, provides an operating area for the turbine. The control of the inter-turbine bleed valve 86 in conjunction with the air inlet throttle valve 87 permits operation of the gas turbine at any point within the cross-hatched area 102 and an instantaneous load change, whether increase or decrease, to any other point along a vertical line within the confines of such area. Such vertical line means no change in compressor speed. However, as a practical matter, a change of compressor speed not greater than 5 percent will enable the speed of the power turbine wheel to be maintained within as close a deviation as 1 percent of rated speed and also the recovery from upset, i.e. load change, will not exceed two seconds.

The effect of load upset, as an instantaneous 50 percent load increase, is graphically illustrated in FIG. 5. There the two curves show a comparison of power turbine wheel speed deviation as related to time for a duel shaft gas turbine, the curve 106 representing one equipped with supplementary controls (with auxiliary valves 85–87) and the other curve 107 representing one equipped with only conventional controls (without auxiliary valves 85–87). It will be noted from FIG. 5 that the speed deviation of the power turbine rotor for the inventive dual shaft gas turbine (curve 106) is less than ½ percent and recovery occurs within two seconds, whereas the turbine without auxiliary control valves (curve 107) shows a speed deviation for the power turbine rotor in excess of 1 percent and still increasing at the end of seven seconds.

Since it is essential to actuate the auxiliary valves 85, 86 and 87 very quickly upon the instantaneous application or removal of a load to the gas turbine, the use of electrolyhydraulic servo valves for the actuators 88, 89 and 90 is preferred. Such servo valves have a high speed response, i.e. displacement of a spool valve to meter the flow of pressurized hydraulic fluid to a piston and cylinder device which will actually move the movable element of the corresponding auxiliary valve. Further, such servo valves respond proportionately to the strength or amperage of the electrical command signal. The advantage of using an electrical control system is that the electrical command signals can be transmitted over the lines 95, 98 and 96 for the valve actuators 88, 89 and 90. If the signals over these lines were pneumatic or hydraulic, some delay would occur due to compressibility of the pneumatic fluid in that case, and compliance of the various fluid conduits (tubing) in both cases of pneumatic and hydraulic fluids. The preferred electrohydraulic servo valves can open the auxiliary valves 85, 86 and 87 which they control individually in a fraction of a second, even fully open in say 0.1 second. Where such electrohydraulic servo valves are employed the auxiliary valve control means will be so constructed as to generate electrical command signals of predetermined magnitude for transmission over the various auxiliary valve control lines 95, 96 and 98. In such a system it would also be preferred that the load control means 82 transmit an electrical signal over line 94 to the auxiliary valve control means 91 timed in relation to the signal transmitted over line 93 so that the auxiliary valves 85, 86 and 87 would be actuated shortly before load application or rejection, typically 0.1 to 0.2 second.

SINGLE SHAFT GAS TURBINE, FIG. 6

Figure 6:
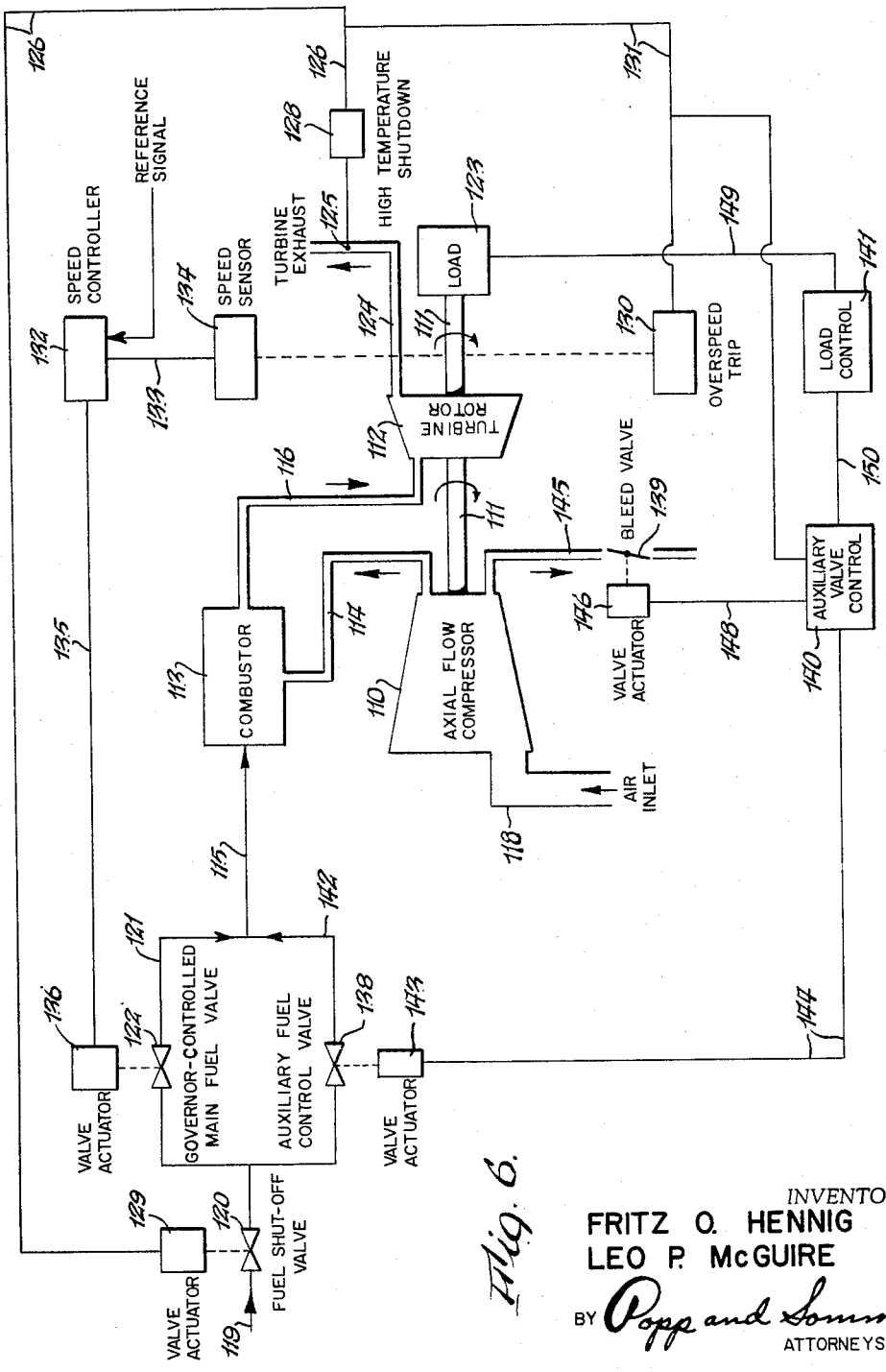
FIG. 6 is a diagrammatic view of a single shaft gas turbine constructed in accordance with the principles of the present invention and therefore constituting another embodiment thereof.

The single shaft gas turbine embodiment of the present invention is diagrammatically illustrated in FIG. 6. There the gas turbine is shown as including an axial flow air compressor 110 fast to a shaft 111 to which a power turbine rotor 112 is also non-rotatably secured. A combustor or combustion chamber 113 receives via the conduit or duct 114 compressed air discharged by the compressor 110. This compressed air is utilized to combust or burn within the combustor 113 fuel received via a fuel inlet line or pipe 115. The hot gases resulting from the combustion of fuel and air within the combustor are conducted via a conduit 116 to the power turbine rotor 112.

The compressor 110 is shown as having an air inlet or intake duct 118.

The fuel is shown as supplied through a main supply conduit or pipe 119 having a shut-off vave 120 operatively arranged therein. Downstream of this valve 120, the supply conduit 119 is shown as having a first branch conduit or pipe 121 which communicates with the inlet conduit 115 leading to the combustor 113. A main or governor-controlled fuel valve 122 is shown as being operatively arranged in the branch conduit 121.

A rotary load device, such as an electrical generator, is shown as driven by the power turbine rotor 112. Suitable means, such as a circuit breaker in the case of an electrical generator, may be employed for coupling the load to or uncoupling it from the power turbine rotor 112 and are intended to be included within the representation of the numeral 123.

The drive fluid flowing through the power turbine rotor 112 is shown as exhausted through an exhaust conduit or duct 124. In order to prevent the turbine from running too hot and thereby becoming damaged, a temperature sensor 125 is shown as arranged in the exhaust duct 124. This sensor 125 is operatively associated via a line 126, in which a high temperature shutdown device 128 is arranged, with an actuator 129 for the fuel shut-off valve 120.

In order to prevent overspeed of the rotating shaft 111, a suitable overspeed trip device 130 is operatively associated with the turbine shaft 111 and also operatively associated via the line 131 within the control line 126 which leads to the fuel shut-off valve actuator 129. It will thus be seen that the fuel valve 120 will be shut off either if the temperature of the exhaust fluid discharged by the turbine becomes excessive or if the rotational speed of the shaft 111 and hence power turbine rotor 112 becomes excessive.

Normal speed of the power turbine rotor 112 and its shaft 111 is governor-controlled by suitable speed control means 132 which are shown as being operatively associated via the line 133 with suitable speed sensing means 134, and also operatively associated via the line 135 with an actuator 136 for the main fuel control valve 122. The speed sensing means 134 are suitably operatively associated with the turbine shaft 111. The speed controller 132 operates in a manner similar to that for the speed controller 78 shown in FIG. 1.

The signals transmitted over the various control lines 126, 131, 133 and 135 may be electric, pneumatic or hydraulic and the valve actuators 129 and 136 will be selected as to type accordingly.

What has been described so far is a conventional single shaft gas turbine having a conventional control system in which the speed of the power turbine rotor 112 is regulated normally by the speed controller 132, trip 130 and high temperature shut-down 128 are safety devices.

In the embodiment of the invention shown in FIG. 6, the means for effecting rapid load acceptance and rejection within predetermined limits of speed deviation of the power turbine rotor 112 and its shaft 111, are shown as comprising auxiliary valve means including a first valve 138 arranged to control the flow of auxiliary fuel to the combustor 113, and a second valve 139 arranged to control the amount of compressed air supplied by the compressor 110 to the combustor 113. Means, including the auxiliary valve control means 140 and load control means 141, are operatively associated with the load device 123 to control alternate load coupling to and uncoupling from the power turbine rotor 112 and also operatively associated with both the auxiliary valves 139 and 139 to control their respective operations.

The auxiliary fuel control valve 138 which may be of any suitable type is shown as being operatively arranged in a second branch conduit or pipe 142 which at one end communicates with the fuel supply conduit 119 on the downstream side of the fuel shut-off valve 120 and at its other end communicates with the fuel inlet conduit 115 leading to the combustor 113. An actuator 143 is operatively associated with the auxiliary fuel control valve 138 and is also operatively associated with the valve control means 140 via the line 144.

The other auxiliary valve 139 is shown as operatively arranged in a conduit 145 suitably connected at one end to the discharge of the compressor 110 and communicating with the atmosphere at its other end. This valve 139, which is shown as being of the butterfly type although any suitable other type may be employed, is operatively arranged to bleed off in a variably controllable manner the compressed air discharge of the compressor 110 and thereby control the amount of compressed air which is supplied by the compressor through the conduit 114 to the combustor 113. The bleed valve 139 is shown as being operatively associated with an actuator 146, in turn operatively associated via the line 148 with the valve control means 140.

The load control means 141 are shown as being operatively associated via the line 149 with the load device 123 to control alternate load coupling to and uncoupling from the power turbine rotor 112. These load control means 141 are also operatively associated via the line 150 with the auxiliary valve control means 140 to signal such means 140 when to control operation of the actuators 143 and 146 for their respective valves 138 and 139, such valve control being in predetermined timed relation to the coupling and uncoupling of the load device 123 to the power turbine wheel 112.

The load control means 141 is a programmer which signals the auxiliary valve control means 140 that the load is to be applied or rejected and also closes or opens an instrumentality, such as a generator circuit breaker, at the proper instant in order to couple or uncouple the load. The load control means 141 is in effect a variable timing device and is set according to the nature and magnitude of the load for the cyclic operation desired.

The auxiliary valve control means 140 are so arranged to permit individual settings for the valves 138 and 139 according to the desired load and to transmit the signal for actuation of the respective actuators 143 and 146 of these valves upon receipt of a signal from the load control means 141. The valve control means 140 may also be arranged to actuate the valves 138 and 139 to a predetermined safe position in the event of malfunctioning of the control system.

While the control signal transmitted through the various lines 144, 148, 149 and 150 may be of any suitable type such as electric, pneumatic or hydraulic, it is preferred, for the same reasons discussed for the embodiment in FIG. 1, to employ electrohydraulic servo valves for the actuators 143 and 146 and thereby transmit electric control signals through the various lines 144, 148, 149 and 150.

Since the single shaft 111 connects the power turbine rotor 112 to the rotor of air compressor 110, it is necessary for all of these elements which rotate together to rotate at a substantially constant speed within the speed deviation permissible for the purpose for which the load is being used. The main fuel valve 122 will remain substantially unadjusted during all operations of the gas turbine since this valve is governor-controlled and the specification of the particular use dictates the speed at which the turbine is to drive the load device 123.

At base or low load, the auxiliary fuel control valve 138 is relatively closed and the bleed valve 139 is relatively open. At high load, the auxiliary fuel control valve 138 is relatively open and the bleed valve 139 is relatively closed. The extent to which both valves open and close depends upon the level of the base load and the magnitude of the load change therefrom when the high load is applied. Both valves are required to operate quickly and substantially simultaneously when the load is instantaneously accepted or rejected by the gas turbine in order to maintain the constancy of speed within the allowable tolerance.

When the bleed valve 139 is open it will be seen that the compressor-turbine rotor is rotating at high load speed even though only the base load is coupled thereto in effect. However, at this time only a predetermined part of the air compressor discharge is being supplied to the combustor 113 to support the combustion of a reduced supply of fuel. The desired turbine-inlet temperature is developed by such products of combustion and substantially this same temperature is maintained when more fuel and more compressed air are supplied to the combustor 113 at and during the time of high load application.

SINGLE SHAFT GAS TURBINE MODIFICATION, FIG. 7

In some applications of a single shaft gas turbine, it may be more desirable to provide a throttle valve 151 arranged in the air intake duct 118 for the compressor 118 instead of the bleed valve 139 shown in FIG. 6. This valve 151 is shown as controlled by a valve actuator 152 in turn controlled by a signal transmitted over line 153 associated with the auxiliary valve control means.

SINGLE SHAFT GAS TURBINE MODIFICATION, FIG. 8

For other applications of a single shaft gas turbine, it may be advantageous to combine the turbine controls shown in FIGS. 6 and 7. Thus, in FIG. 8, there is shown the compressor discharge bleed valve 139 arranged in the conduit 145 with its actuator 146 and control line 148 therefor, as well as the air intake throttle valve 151 with its actuator 152 and control line 153.

In the various embodiments of the invention and modifications illustrated, means are provided to generate gas resulting from the combustion of fuel and air for driving a power turbine rotor, and auxiliary valve means are provided to regulate fuel supply to the gas generating means and to control the amount of effective drive gas supplied to the power turbine rotor, whereby the gas turbine is capable of rapidly accepting or rejecting a load within a permissible small tolerance of speed deviation. Such gas generating means include the compressor 51, combustor 54 and high pressure turbine rotor 56, in the embodiment of FIG. 1; and include the compressor 110 and combustor 113, in the embodiments of FIGS. 6–8. Such auxiliary valve means include the auxiliary fuel valve 85, interturbine bleed valve 86 and compressor air inlet throttle valve 87, in the embodiment of FIG. 1; and include the auxiliary fuel valve 138 in the embodiment of FIG. 6 and by reference also in the modifications of FIGS. 7 and 8, further including compressor discharge bleed valve 139, in the embodiment of FIG. 6 and its modification in FIG. 8, and compressor air inlet throttle valve 151, in the FIG. 7 modification of the FIG. 6 embodiment.

These embodiments and modifications, which otherwise accomplish the objectives stated, are intended as illustrative and not limitative of the present invention the scope of which is to be measured by the appended claims.

What is claimed is:

1. A method of operating a gas turbine, having a power turbine rotor on which the load alternates cyclically and substantially instantaneously between a base load level and a high load level, so as to enable the turbine rapidly to accept and reject the load change within predetermined limits of speed deviation of said rotor, such turbine also including a compressor and a combustor supplied with compressed air from said compressor for burning fuel to generate a drive gas supplied to said rotor: said method comprising the steps of rapidly changing the amount of fuel supplied to said combustor in predetermined anticipatory timed relation to load change from one to the other of said load levels, increasing when the load increases and decreasing when the load decreases; and substantially simultaneously with the occurrence of such fuel change rapidly changing the amount of drive gas applied to said rotor, increasing when the load increases and decreasing when the load decreases.

2. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the load on said device alternating cyclically and substantially instantaneously between a base load level and a high load level, the combination therewith of means for effecting rapid load acceptance and rejection within predetermined limits of speed deviation of said rotor, comprising auxiliary fuel control valve means operatively associated with said combustor and relatively closed when the turbine is operating at said base load level and relatively open when the turbine is operating at said high load level, air intake throttle valve means for said compressor and relatively closed when the turbine is operating at said high load level, compressor discharge bleed valve means relatively open when the turbine is operating at said base load level and relatively closed when the turbine is operating at said high load level, and means arranged to operate all of said valve means substantially simultaneously and in predetermined anticipatory timed relation to load change from one to the other of said load levels.

3. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said combustor, first actuator means for said first valve means, second valve means arranged to throttle the air supply to said compressor, second actuator means for said second valve means, third valve means arranged to bleed off the discharge of said compressor, third actuator means for said third valve means, valve control means operatively associated with all of said actuator means, and load control means operatively associated with said load device to control alternate load coupling to and uncoupling from said rotor and also operatively associated with said valve control means to control operation of all of said valve means in predetermined anticipatory timed relation to such load coupling and uncoupling.

4. A method of operating a gas turbine of the dual shaft type, having a low pressure turbine rotor on which the load alternates cyclically and substantially instantaneously between a base load level and a high load level, so as to enable the turbine rapidly to accept and reject the load change within predetermined limits of speed deviation of said low pressure turbine rotor, such turbine also including an axial flow air compressor connected by one shaft to a high pressure turbine rotor, said low pressure turbine rotor being on another and separate shaft, an inter-turbine duct between said turbine rotors and a combustor supplied with compressed air from said compressor for burning fuel to generate a drive gas supplied to said high pressure turbine rotor: said method comprising the steps of rapidly changing the amount of fuel supplied to said combustor in predetermined anticipatory timed relation to load change from one to the other of said load levels, increasing when the load increases and decreasing when the load decreases; substantially simultaneously with the occurrence of such fuel change rapidly changing the portion of drive gas which flows through said duct to said low pressure turbine rotor, increasing such flow when the load increases and decreasing such flow when the load decreases; and also substantially simultaneously with the occurrence of such fuel change rapidly changing the amount of air which flows through said compressor, increasing when the load increases and decreasing when the load decreases.

5. In the operation of a gas turbine of the dual shaft type having a compressor including a rotor, a high pressure turbine rotor driving said compressor rotor, a combustor supplied with compressed air from said compressor for burning fuel to generate a drive gas supplied to said high pressure turbine rotor, and a free low pressure turbine rotor driven by such drive gas after passing through said high pressure turbine rotor and driving a load which alternates cyclically and substantially instantaneously between a base load level and a high load level, the method of enabling the turbine rapidly to accept and reject the load change within predetermined limits of speed deviation of said free turbine rotor, comprising the steps of rapidly and substantially adjusting, in predetermined anticipatory timed relation to load change from one to the other of said load levels, the fuel supplied to said combustor, the air supplied to said combustor and the drive gas supplied to said free turbine rotor, increasing fuel supply, air supply and drive gas supply when the load increases and decreasing fuel supply, air supply and drive gas supply when the load decreases, whereby said compressor rotor rotates at all times and regardless of load at a substantially constant speed which corresponds to the rated speed for the turbine when subjected to load at said high load level.

6. A method of operating a gas turbine of the single shaft type, having a turbine rotor on which the load alternates cyclically and substantially instantaneously between a base load level and a high load level, so as to enable the turbine rapidly to accept and reject the load change within predetermined limits of speed deviation of said rotor, such turbine also including an axial flow air compressor connected by such single shaft to rotor, and a combustor supplied with compressed air from said compressor for burning fuel to generate a drive gas supplied to said rotor: said method comprising the steps of rapidly changing the amount of fuel supplied to said combustor in predetermined anticipatory timed relation to load change from one to the other of said load levels, increasing when the load increases and decreasing when the load decreases; and substantially simultaneously with the occurrence of such fuel change rapidly changing the amount of compressed air supplied to said combustor by said compressor, increasing when the load increases and decreasing when the load decreases.

7. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising first valve means arranged to control the supply of fuel to said gas generating means, second valve means arranged to control the supply of effective drive gas to said rotor, and programmed means operatively associated with said load device to control alternate load coupling to and uncoupling from said rotor and also operatively associated with both said valve means to control their respective operations in predetermined anticipatory timed relation to said load coupling and uncoupling.

8. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said gas generating means, second valve means arranged to control the supply of effective drive gas to said rotor, and programmed means operatively associated with said load device to control alternate load coupling to and uncoupling from said rotor and also operatively associated with both said valve means to control their respective operations in predetermined anticipatory timed relation to said load coupling and uncoupling.

9. In a gas turbine having a power turbine rotor, means to generate gas resulting from the combustion of fuel and air for driving said rotor and including a main fuel valve controlled in response to the rotational speed of said rotor, and a rotary load device operatively associated with said rotor, the combination therewith of means for effecting rapid load acceptance and rejection within predetermined limits of speed deviation of said rotor, comprising first valve means independent of said main valve and arranged to control the supply of auxiliary fuel to said gas generating means, second valve means arranged to control the supply of effective drive gas to said rotor, and programmed means operatively associated with said load device to control alternate load coupling to and uncoupling from said rotor and also operatively associated with said first and second valve means to control their respective operations in predetermined anticipatory timed relation to said load coupling and uncoupling.

10. In a gas turbine having a power turbine rotor, an air compressor, means to generate gas resulting from the combustion of fuel and air supplied by said compressor for driving said rotor and including a main fuel valve controlled in response to the rotational speed of said rotor, and a rotary load device operatively associated with said rotor, the combination therewith of means for effecting rapid load acceptance and rejection within predetermined limits of speed deviation of said rotor, comprising first valve means independent of said main valve and arranged to control the supply of auxiliary fuel to said gas generating means, second valve means arranged to control the supply of effective drive gas to said rotor and including air intake throttle valve means for said compressor, and programmed means operatively associated with said load device to control alternate load coupling to and uncoupling from said rotor and also operatively associated with said first and second valve means to control their respective operations in predetermined anticipatory timed relation to said load coupling and uncoupling.

11. In a gas turbine having a power turbine rotor, means to generate gas resulting from the combustion of fuel and air for driving said rotor, and a rotary load device operatively associated with said rotor, the combination therewith of means for effecting rapidy load acceptance and rejection within predetermined limits of speed deviation of said rotor, comprising auxiliary fuel control valve means operatively associated with said gas generating means, bleed valve means arranged to control the supply of effective drive gas to said rotor, and programmed means operatively associated with said load device to control alternate load coupling to and uncoupling from said rotor and also operatively associated with both said valve means to control their respectively operations in predetermined anticipatory timed relation to said load coupling and uncoupling.

12. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising auxiliary fuel control valve means operatively associated with said gas generating means, bleed valve means arranged to control the supply of effective drive gas to said rotor, and timing means arranged to alternate cyclically the change in load on said load device and also to effect substantially simultaneous operation of both said valve means a predetermined time prior to load change.

13. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said gas generating means, first actuator means for said first valve means, second valve means arranged to control the supply of effective drive gas to said rotor, second actuator means for said second valve means, valve control means operatively associated with both said actuator means, and load control means operatively associated with said load device to control alternate load coupling to and uncoupling from said rotor and also operatively associated with said valve control means to control operation of both said valve means in predetermined anticipatory timed relation to such load coupling and uncoupling.

14. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising electrohydraulically actuated first valve means arranged to control the supply of auxiliary fuel to said gas generating means, electrohydraulically actuated second valve means arranged to control the supply of effective drive gas to said rotor, and timing means arranged to alternate cyclically the change in load on said load device and also to signal electrically and substantially simultaneously the operation of both said valve means a predetermined time prior to load change.

15. In a gas turbine having a power turbine rotor, means to generate gas resulting from the combustion of fuel and air for driving said rotor, and a rotary load device operatively associated with said rotor, the load on said device alternating cyclically and substantially instantaneously between a base load level and a high load level, the combination therewith of means for effecting rapid load acceptance and rejection within predetermined limits of speed deviation of said rotor, comprising auxiliary fuel control valve means operatively associated with said gas generating means and relatively closed when the turbine is operating at said base load level and relatively open when the turbine is operating at said high load level, bleed valve means arranged to control the supply of effective drive gas to said rotor and relatively open when the turbine is operating at said base load level and relatively closed when the turbine is operating at said high load level, and means arranged to operate both said valve means substantially simultaneously and in predetermined anticipatory timed relation to load change from one to the other of said load levels.

16. In a gas turbine having a power turbine rotor, means to generate gas resulting from the combustion of fuel and air for driving said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said gas generating means, second valve means operatively associated with said gas generating means to control the supply of effective drive gas to said rotor, and means operatively associated with said load device to control alternate load coupling to and uncoupling from said rotor and also operatively associated with both said valve means to control their respective operations in predetermined anticipatory timed relation to such load coupling and uncoupling.

17. In a gas turbine of the dual shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising first valve means arranged to control the supply of fuel to said combustor, second valve means arranged to control the supply of effective drive gas to said low pressure turbine rotor, and programmed means operatively associated with said load device to control alternate load coupling to and uncoupling from said low pressure turbine rotor and also operatively associated with both said valve means to control their respective operations in predetermined anticipatory timed relation to said load coupling and uncoupling.

18. In a gas turbine of the dual shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising first valve means arranged to control the supply of auxiliary fuel to said combustor, second valve means arranged to control the supply of effective drive gas to said low pressure turbine rotor, and programmed means operatively associated with said load device to control alternate load coupling to and uncoupling from said low pressure turbine rotor and also operatively associated with both said valve means to control their respective operations in predetermined anticipatory timed relation to said load coupling and uncoupling.

19. In a gas turbine of the duel shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising auxiliary fuel control valve means operatively associated with said combustor, bleed valve means communicating with said duct, and means operatively associated with said load device to control alternate load coupling to and uncoupling from said low pressure turbine rotor and also operatively associated with both said valve means to control their respective operations in predetermined anticipatory timed relation to such load coupling and uncoupling.

20. In a gas turbine of the dual shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising first valve means arranged to control the supply of auxiliary fuel to said combustor, first actuator means for said first valve means, second valve means communicating with said duct and operative to bleed off drive gas flowing therethrough, second actuator means for said second valve means, valve control means operatively associated with both said actuator means, and load control means operatively associated with said load device to control alternate load coupling to and uncoupling from said low pressure turbine rotor and also operatively associated with said valve control means to control operation of both said valve means in predetermined ant icipatory timed relation to such load coupling and uncoupling.

21. In a gas turbine of the duel shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising auxiliary fuel control valve means operatively associated with said combustor, bleed valve means communicating with said duct, throttle valve means operatively arranged to control the air intake for said compressor, and means operatively associated with said load device to control alternate load coupling to and uncoupling from said low pressure turbine rotor and also operatively associated with all of said valve means to control their respective operations in predetermined anticipatory timed relation to such load coupling and uncoupling.

22. In a gas turbine of the dual shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the load on said device alternating cyclically and substantially instantaneously between a base load level and a high load level, the combination therewith of means for effecting rapid load acceptance and rejection within predetermined limits of speed deviation of said low pressure turbine rotor, comprising auxiliary fuel control valve means operatively associated with said combustor and relatively closed when the turbine is operating at said base load level and relatively open when the turbine is operating at said high load level, bleed valve means communicating with said duct and relatively open when the turbine is operating at said base load level and relatively closed when the turbine is operating at said high load level, air intake throttle valve means for said compressor and relatively closed when the turbine is operating at said base load level and relatively open when the turbine is operating at said high load level, and means arranged to operate all of said valve means substantially simultneously and in predetermined anticipatory timed relation to load change from one to the other of said load levels.

23. In a gas turbine of the dual shaft type having an axial flow air compressor connected by one shaft to a high pressure turbine rotor, a low pressure turbine rotor on another and separate shaft, an inter-turbine duct between said rotors, a combustor supplied with compressed air from said compressor for burning fuel to generate a drive gas supplied to said high pressure turbine rotor, and a rotary load device operatively associated with said low pressure turbine rotor, the combination therewith of means for effecting rapid load acceptance and rejection within predetermined limits of speed deviation of said low pressure turbine rotor, comprising first valve means arranged to control the supply of auxiliary fuel to said combustor, first actuator means for said first valve means, second valve means communicating with said duct and operative to bleed off drive gas flowing therethrough, second actuator means for said second valve means, third valve means operatively arranged to throttle the air supply to said compressor, third actuator means for said third valve means, valve control means operatively associated with all of said actuator means, and load control means operatively associated with said load device to control alternate load coupling to and uncoupling from said low pressure turbine rotor and also operatively associated with said valve control means to control operation of all of said valve means in predetermined anticipatory timed relation to such load coupling and uncoupling.

24. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising first valve means arranged to control the supply of fuel to said combustor, second valve means arranged to control the amount of compressed air supplied by said compressor to said combustor, and programmed means operatively associated with said load device to control alternate load coupling to and uncoupling from said rotor and also operatively associated with both said valve means to control their respective operations in predetermined anticipatory timed relation to said load coupling and uncoupling.

25. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said combustor, second valve means arranged to control the amount of compressed air supplied by said compressor to said combustor, and programmed means operatively associated with said load device to control alternate load coupling to and uncoupling from said rotor and also operatively associted with both said valve means to control their respective operations in predetermined anticipatory timed relation to said load coupling and uncoupling.

26. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection wthin predetermined limits of speed deviation of said rotor, comprising auxiliary fuel control valve means operatively associated with said combustor, compressor discharge bleed valve means, and means operatively associated with said load device to control alternate load coupling to and uncoupling from said rotor and also operatively associated with both said valve means to control their respective operations in predetermining anticipatory timed relation to such load coupling and uncoupling.

27. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the load on said device alternating cyclically and substantially instantaneously between a base load level and a high load level, the combination therewith of means for effecting rapid load acceptance and rejection within predetermined limits of speed deviation of said rotor, comprising auxiliary fuel control valve means operatively associated with said combustor and relatively closed when the turbine is operating at said base load level and relatively open when the turbine is operating at said high load level, compressor discharge bleed valve means relatively open when the turbine is operating at said base load level and relatively closed when the turbine is operating at said high load level, and means arranged to operate both said valve means substantially simultaneously and in predetermined anticipatory timed relation to load change from one to the other of said load levels.

28. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said combustor, first actuator means for said first valve means, second valve means ararnged to bleed off the discharge of said compressor and thereby control the amount of compressed air supplied by said compressor to said combustor, second actuator means for said second valve means, valve control means operatively associated with both said actuator means, and load control means operatively associated with said load device to control alternate load coupling to and uncoupling from said rotor and also operatively associated with said valve control means to control operation of both said valve means in predetermined anticipatory timed relation to such load coupling and uncoupling.

29. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising auxiliary fuel control valve means operatively associated with said combustor, throttle valve means operatively arranged to control the air intake for said compressor, and means operatively associated with said load device to control alternate load coupling to and uncoupling from said rotor and also operatively associated with both said valve means to control their respective operations in predetermined anticipatory timed relation to such load coupling and uncoupling.

30. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the load on said device alternating cyclically and substantially instantaneously between a base load level and a high load level, the combination therewith of means for effecting rapid load acceptance and rejection within predetermined limits of speed deviation of said rotor, comprising auxiliary fuel control valve means operatively associated with said combustor and relatively closed when the turbine is operating at said base load level and relatively open when the turbine is operating at said high load level, air intake throttle valve means for said compressor and relatively closed when the turbine is operating at said base load level and relatively open when the turbine is operating at said high load level, and means arranged to operate both said valve means substantially simultaneously and in predetermined anticipatory timed relation to load change from one to the other of said load levels.

31. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising first valve means arranged to control the supply of auxiliary fuel to said combustor, first actuator means for said first valve means, second valve means arranged to throttle the air supply to said compressor, second actuator means for said second valve means, valve control means operatively associated with both said actuator means, and load control means operatively associated with said load device to control alternate load coupling to and uncoupling from said rotor and also operatively associated with said valve control means to control operation of both said valve means in predetermined anticipatory timed relation to such load coupling and uncoupling.

32. In a gas turbine of the single shaft type having an axial flow air compressor connected by a shaft to a turbine rotor, a combustor supplied with compressed air from said compressor for burning fuel to generate a drive gas supplied to said rotor, and a rotary load device operatively associated with said rotor, the combination therewith of means for effecting rapid load acceptance and rejection within predetermined limits of speed deviation of said rotor, comprising auxiliary fuel control valve means operatively associated with said combustor, throttle valve means operatively arranged to control the air intake for said compressor, compressor discharge bleed valve means, and means operatively associated with said load device to control alternate load coupling to and uncoupling from said rotor and also operatively associated with all of said valve means to control their respective operations in predetermined anticipatory timed relation to such load coupling and uncoupling.

References Cited by the Examiner
UNITED STATES PATENTS

| | | | |
|---|---|---|---|
| 2,547,093 | 4/1951 | Ray | 60—39.17 X |
| 2,613,500 | 10/1952 | Lysholm. | |
| 2,618,926 | 11/1952 | Pfenninger | 60—39.16 X |
| 2,627,717 | 2/1953 | Waller | 60—39.25 X |
| 2,759,327 | 8/1956 | Huber | 60—39.25 X |
| 2,941,601 | 6/1960 | Best | 170—135.74 |
| 3,168,810 | 2/1965 | Gatzemeyer | 60—39.16 |
| 3,180,425 | 4/1965 | Blackaby | 170—135.74 |

MARK NEWMAN, *Primary Examiner.*

ABRAM BLUM, *Examiner.*

S. N. GARBER, *Assistant Examiner.*